INVENTOR
GUSTAV B. EGGERT
BY George B. Willcox
ATTORNEY

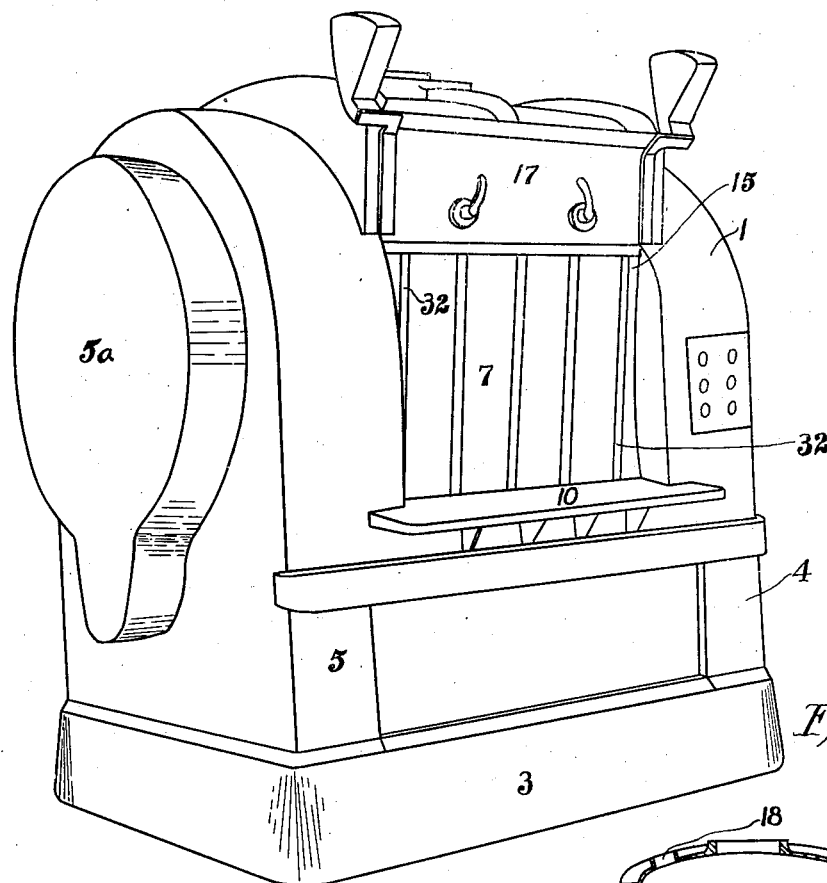
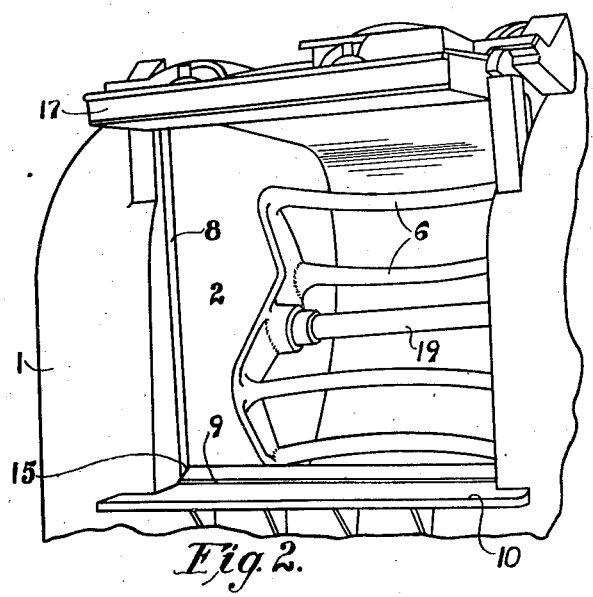
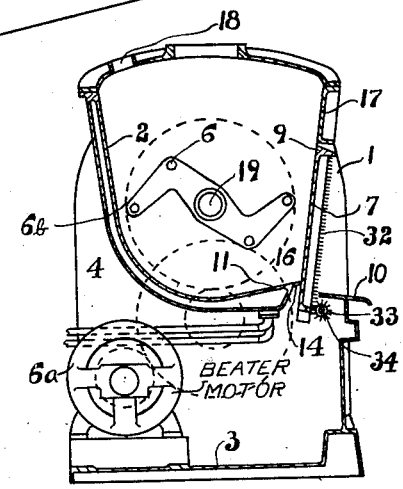
Fig. 1.
Fig. 2.
Fig. 3.
INVENTOR
GUSTAV B. EGGERT
BY George B Willcof
ATTORNEY June 10, 1930.                G. B. EGGERT                1,763,292
MIXING AND KNEADING MACHINE
Filed Feb. 6, 1928          2 Sheets-Sheet 2

Patented June 10, 1930

1,763,292

UNITED STATES PATENT OFFICE

GUSTAV B. EGGERT, OF SAGINAW, MICHIGAN, ASSIGNOR TO BAKER PERKINS COMPANY, INC., OF SAGINAW, MICHIGAN, A CORPORATION OF NEW YORK

MIXING AND KNEADING MACHINE

Application filed February 6, 1928. Serial No. 252,084.

This invention is an improvement in dough mixing machines having stationary or non-tiltable troughs or bowls provided with side outlet means for unloading the mass of finished dough.

The invention is characterized by a new trough construction wherein a side of the trough is a flat or substantially flat vertically sliding door that contributes certain advantages in structural design, as well as improved speed and efficiency of operation.

Among the advantages of this door arrangement is that it provides a means for easily unloading the mass of completed dough. The beaters automatically drive it out through the door opening and deliver it over an unloading shelf which forms a part of the mixer.

The trough and the supporting frame being bolted together as an integral structure afford upmost rigidity to withstand without vibration the enormous internal stresses and pounding impacts to which high-speed mixers of large capacity are subjected in normal conditions of use.

The sliding door furthermore serves as a wall for a dough pocket that is located at one of the lower corners of the mixing trough. In this pocket the dough violently thrown by a beater against the door is turned somewhat and is then caught up by the next beater and stretched, an operation which has been found to be highly effective as a conditioning treatment for the dough during the mixing process.

Another feature of the invention is a novel means for automatically holding the lower part of the door snugly against the front bottom edge of the trough when the door is closed, so that the liquid ingredients, flour, water, milk etc., when thrown into the mixer can not leak out of the pocket. The door, moreover, is provided with a cushioning device to carry its weight when in its lowered or open position, and to facilitate its upward movement as it starts to close.

There is also included in the invention an improved hood or cover construction, whereby the hood itself is utilized in conjunction with the beaters as a dough stretching device, and to that end the hood constitutes a part of the mixing mechanism. The hood structure also affords an improved device for inspecting the dough while it is being mixed, for taking samples while the beaters are in operation, and for automatic aeration of the mass while being mixed. The aerating means forms part of the hood structure.

A further feature of the invention is a novel mounting for the beater shaft that permits the beaters to be easily taken out through the door for purposes of repair or replacement.

In the drawings Fig. 1 is a front elevation of the machine, the door closed.

Fig. 2 is a detail in perspective, showing the trough, the door open.

Fig. 3 is a part diagrammatic vertical section through the trough in a plane at right angles to the beater shaft.

Figure 4:
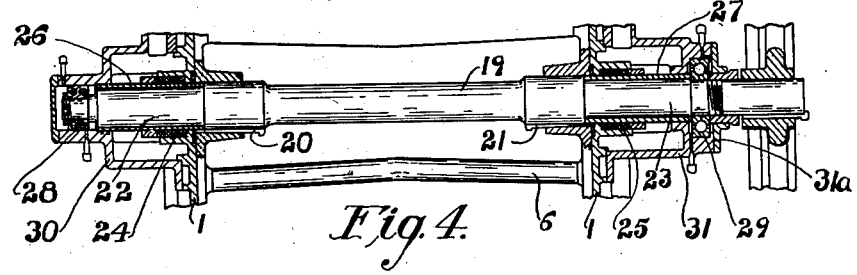
Fig. 4 is a part sectional detail of the beater shaft mounting.

As is clearly shown in the drawings, the mixer consists of a frame or housing 1, carrying a rigidly mounted jacketed mixing trough 2 having an open front, the frame and trough together comprising a rigid structure.

In general the frame consists of a base-plate 3 having at its sides hollow upright pedestals 4, 5. The trough 2 is fixed between and carried by these pedestals. Preferably the beaters 6 are driven by a motor 6ª installed on the base-plate 3 beneath the trough and between the pedestals. The power connection, as a train of gears, is preferably housed in a casing 5ª on pedestal 5, but since the specific gearing is well known in the art and does not constitute per se a claimed feature of the present invention it is not illustrated herein, being merely indicated diagrammatically at 6$^b$ in Fig. 3.

Figure 6:
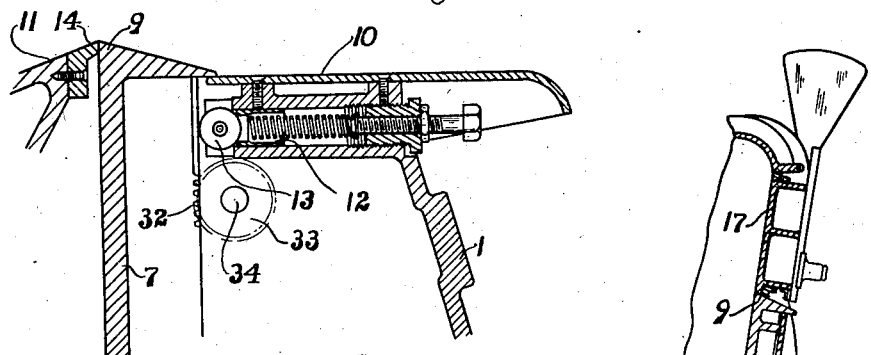
Fig. 6 is an enlarged sectional detail of the device for yieldingly holding the inner face of the door in contact with the marginal edge of the trough.
Figure 5:
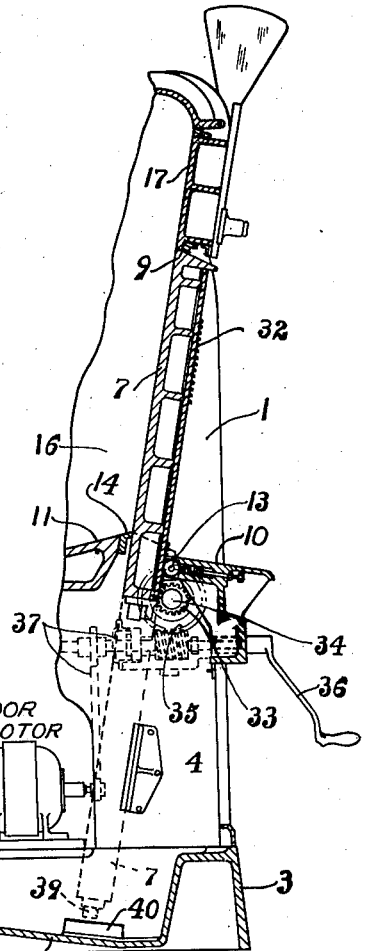
Fig. 5 is an enlarged sectional view of the sliding door, showing the means for raising and lowering it.
Figure 7:
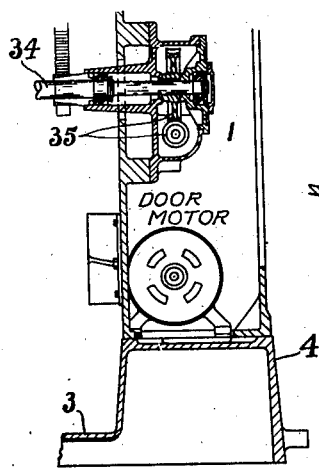
Fig. 7 is a sectional detail of the driving means for the door-actuating shaft.

This frame and trough arrangement imparts great rigidity with a relatively small amount of structural material, and enables the mechanism to be compactly housed to avoid accidents. The jacketed trough itself, which forms an important feature of my invention, is characterized by having for one of its side walls a vertically slidable door 7. The upright side edges of the door are guided in ways 8. Raised, as shown in Figs. 1, 3 and 5, the door forms the front wall of the trough. Lowered so that its top edge 9 is even with the bottom of the trough, as in Figs. 2 and 6, it discloses an unobstructed discharge opening through which the finished mass of dough can be ejected by suitable revolution of beaters 6. The dough mass is delivered across a shelf 10, which in effect constitutes a continuation of the front part or apron 11 of the trough bottom. From the apron it can be put into a suitable dough receptacle.

An automatic spring-pressed device normally keeps the lower part of the door snug against the edges of the trough without interfering with the ease of raising and lowering the door. It also prevents leakage of the fluid contents of the trough. It consists of one or more spring-pressed plungers 12 each provided with an anti-friction roller 13. The plunger is slidable lengthwise in a tubular guideway underneath the shelf 10. Roller 13 presses against the outer face of the door 7, urging it snugly against the sharp edge 14 of a scraper made of stainless steel or similar material that forms the front edge of discharge apron 11. The scraper is preferably detachable from the apron for purposes of replacement or repair.

The upright side edges 15 of the door are surfaced to a sliding fit in the ways 8. These ways support the door against the outward slapping and pounding action of the dough mass under treatment.

Dough while being worked by the high speed beaters 6 is driven by centrifugal force into the space or pocket 16 and against the door 7. In the pocket the dough turns with a rolling movement and the next impeller strikes into a different part of the mass, gathers it up and stretches it out. Stretching in this manner has long been recognized as a valuable aid in the rapid conditioning of a dough batch.

The hood of the trough embodies novel features of construction and operation which will now be explained. The hood is made of heavy material such as cast iron or steel reinforced by exterior ribs and capable of withstanding the impacts of the dough masses in a high speed mixer. The hood forms an integral part of the rigid frame and trough structure. Its approximately flat cambered shape with front and rear edges directed downward in a pronounced curve to merge with the front and rear walls of the trough, as distinguished from the cylindrical or curved hood heretofore commonly used, is for the purpose of providing a strong roof area with pocket-like margins against which the beaters 6 hurl the dough by centrifugal force and then before it can drop, strike into it again and drive it circumferentially in such a way as to stretch it. The usual cylindrical hood heretofore used merely allowed it to be propelled in a lump around the inner face of the hood without the above described stretching action along the roof. Hence near the roof of the trough as well as in pocket 16 there is obtained an advantageous stretching and rolling of the dough, as well as mixing and beating and the automatic removal from the surfaces of all dough shreds. The amount of power and time required for thoroughly mixing a given quantity of dough ingredients is thereby reduced and the dough mixing operation can be completed with a materially less number of revolutions of the beaters than is usually required for a given batch.

In the front part of the hood certain novel structural features may be incorporated if desired, namely, a door 17 that is used for purposes of inspection and sampling while the machine is in operation and also to facilitate handling and to provide automatic aeration of the dough. It is located between the upper limit of travel of the sliding door 7 and the front edge of the hood. In the rear part of the hood is the door 18 of an air exit opening. Door 17 when opened admits air to the stretched and sheeted dough piece during its flight across the top of the trough and door 18 discharges the air. These two doors and the beaters co-operate to produce the effect of aeration that is desirable in high-speed mixers. There results a more complete permeation of the dough mass with air at the upper front part of the trough, where the sheeting effect is greatest. Also, a greater degree of oxidation takes place in certain substances in the flour, resulting in a more complete formation of gluten and a pronounced whitening or bleaching of the dough. If door 17 is not employed, door 7 may be lengthened to take its place, and will accomplish the same purpose if it is lowered slightly.

After a batch of dough is thoroughly mixed and beated it is unloaded in the following manner:

The door 7 is lowered while the beaters 6 are revolving. They push the mass of dough out upon shelf 10, across the top edge 9 of the door, which in the lower position of the door is flush with the shelf. Any part of the mass that is carried upward past the door opening by the ascending beaters can be readily knifed off before it arrives at the top of the trough, dropping onto the shelf. When door 7 is down the door 17 can be opened as shown in Fig. 2 to expose the entire inside of the machine, all parts of which are within easy reach of the operator standing in front of the machine.

During the operation of the mixer door 17 and a charging door 18 in the rear part of the hood are usually left open. The beaters and the material together then constitute an air circulating device by which effective dough aeration and ventilation are maintained. The ventilating fan and blower which heretofore has been commonly employed is rendered unnecessary. By this means the temperature of the dough may be diminished.

The beater shaft 19 and its manner of mounting in the frame of the machine possess features of novelty that enable the beater to be easily taken out and replaced when the door 7 is opened. In Fig. 4 the beaters 6 are shown secured to shaft 19 by removable keys 20, 21. The shaft is of reduced diameter at 22 and 23 near its ends. The reduced parts project through stuffing boxes 24, 25 located respectively on the end walls of the trough 2. The wearing surfaces of the shaft are jacketed with replaceable tubular bushings 26 and 27. The outboard ends of the shaft are further reduced and are mounted in anti-friction bearings 28 and 29 that are carried by hollow box-like housings 30 and 31 secured to the frame 1. The bearing 28 is a floating bearing slidable endwise in the bore of housing 30.

The housings enclose and protect the stuffing boxes 24, 25. By removing the cap 31ª of 31 and taking out the keys 20, 21 the shaft 19 can be pulled out to the right, Fig. 4, leaving the beaters 6 loose in the trough.

The door actuating mechanism consists in a toothed rack 32 near the upright edge of the door, a pair of pinions 33 mounted on a pinion shaft 34 rotatable in fixed bearings on the frame, a worm and gear 35 for actuating the pinion shaft and a crank 36 for rotating the worm when the door is to be operated by hand. For power operation a door motor is provided, with drive chain and releasable connection 37 to the worm shaft.

Figure 8:
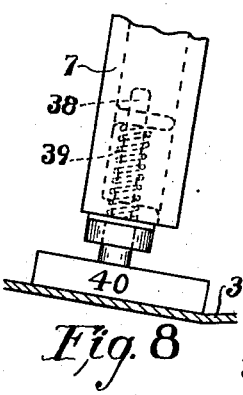
Fig. 8 is a fragmentary side view, showing the spring buffer at the bottom of the sliding door.

To prevent overloading the door motor when starting the door upward, and to cushion the door 7 when lowered, a spring buffer, Figs. 5 and 8, is provided, consisting in one or more sliding bolts 38 mounted in the lower edge of the door 7 and cushioned by means of a helical spring 39.

The lower end of the sliding bolt 38 comes down upon a block 40 which is mounted on the base 3, as shown in Figs. 5 and 8.

Having thus described my invention, what I claim and desire to secure by Letters Patent is:

1. In a dough-working machine, a trough, a rotary beater therein, a door adapted to close one side of said trough while the machine is in operation, said door and an adjacent part of said trough constituting an eccentric pocket in said trough.

2. In a dough-working machine, the combination of the rotary beater, mechanism for driving the beater, a trough in which the beater is mounted, the forward part of the bottom of said trough formed to provide a substantially flat discharge apron, a slidable door capable of up-and-down movement which constitutes when closed a wall of said trough, mechanism for actuating said door, and pressing means adapted to yieldingly hold the inner face of the door in contact with the marginal edge of said apron.

3. In a dough-working machine, the combination of the rotary beater, a stationary trough in which the beater is mounted, a flat slidable door adapted to up-and-down movement and constituting when closed a wall of said trough, and pressing means adapted to keep the door in contact with the edges of said trough when the door is closed and likewise during the up-and-down movement of said door.

4. In a dough-working machine, the combination of a revolving beater and a trough in which the beater is mounted, the forward part of the bottom of said trough shaped to provide a discharge apron, a flat door slidable up-and-down against the edge of said apron and when closed forming together with said apron an angular, eccentrically located pocket, and when fully opened registering at the top face of its upper end with said apron to constitute an unobstructed delivery platen for material propelled outwardly by said beaters.

5. In a dough-working machine, the combination of a revolving beater and a trough in which the beater is mounted, the forward part of the bottom of said trough formed with a discharge apron, a door slidable up-and-down against the edge of said apron and when closed constituting a wall of said trough, a discharge shelf outside of said door and spaced from the edge of said apron, and a ledge at the top of the door adapted when the door is in its lowest position to register with said apron and shelf, for the purposes set forth.

6. In a dough-working machine, the combination of the rotary beater, a stationary trough in which the beater is mounted, a vertically movable sliding door constituting when closed a wall of said trough, and a cambered roof rigidly secured to the rear and end walls of said trough, the edges of said roof along the rear wall of the trough formed with a pronounced downward curve to provide a rounded pocket at the top of the trough, for the purposes set forth.

7. In a dough-working machine, the combination of a rotary beater, a stationary trough in which the beater is mounted, a flat sliding door movable up-and-down and constituting when closed a wall of said trough, a fixed hood, and a movable door mounted between the upper limit of travel of said sliding door and the front edge of said hood for admitting air to the dough during its flight across the top of the trough, and an air exit opening in the rear part of said hood, for the purposes set forth.

8. In a dough-working machine, the combination of a rotary beater, a stationary trough in which the beater is mounted, a vertically movable sliding door constituting when closed a wall of said trough, and a cambered roof rigidly secured to the rear wall and side walls of said trough.

9. In a dough-working machine, the combination of a rotary beater, a trough in which the beater is mounted, the forward part of the bottom of said trough formed with a discharge apron, a member having a scraping edge removably secured to the front edge of said apron, a sliding door capable of up-and-down movement and constituting when closed a wall of said trough, mechanism for actuating said door, and pressing means for keeping the inner face of the door in contact with the scraping edge of said removable member during said up-and-down movement.

10. In a dough-working machine, the combination of a rotary beater, mechanism for actuating the beater, a trough in which the beater is mounted, the forward part of the bottom of said trough formed with a discharge apron, a sliding door capable of up-and-down movement, said door when closed constituting a wall of said trough, mechanism for actuating said door, pressing means for keeping the inner face of the door during said up-and-down movement in contact with the edge of said apron, and cushioning means for said door at the bottom of its travel.

11. In a dough-working machine, the combination of a rotary beater, a stationary trough in which the beater is mounted, a flat sliding door movable up-and-down and constituting when closed a wall of said trough, a fixed cover on said trough, and a movable ventilating and inspection door mounted between the upper limit of travel of said sliding door and the edge of said cover, for the purposes set forth.

12. In a dough-working machine, the combination of a revolvable beater and a trough in which the beater is mounted, the forward part of the bottom of said trough formed with a discharge apron, a door slidable up and down against the edge of said apron and constituting when closed a wall of said trough.

13. In a dough-working machine, the combination of the beater, a trough in which the beater is mounted, and a door slidable in upright guideways carried by the trough, said door constituting when closed a wall of said trough.

14. In a dough-working machine, the combination of the rotary beater, a stationary trough in which the beater is mounted, a door constituting when closed a wall of said trough, and pressing means adapted to keep the door in contact with the edges of the trough when the door is closed and likewise during the opening and closing movements of said door.

In testimony whereof, I affix my signature.

GUSTAV B. EGGERT.